United States Patent
Niegel et al.

(10) Patent No.: US 6,625,136 B1
(45) Date of Patent: Sep. 23, 2003

(54) SPREADER FOR MULTIPLE DATA RATES

(75) Inventors: Michael Niegel, Lauf (DE); Ralf Kukla, Nuremberg (DE); Seyed-Hami Nourbakhsh, Nuremberg (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/353,647

(22) Filed: Jul. 15, 1999

(30) Foreign Application Priority Data

Jul. 20, 1998 (DE) ......................... 198 32 554

(51) Int. Cl.$^7$ ............................. H04B 7/216
(52) U.S. Cl. .................. 370/335; 370/412; 375/130
(58) Field of Search ................. 375/200, 142, 375/141, 140, 206, 346; 370/335, 252, 337, 468, 412

(56) References Cited

U.S. PATENT DOCUMENTS

| | | | |
|---|---|---|---|
| 4,972,408 A | 11/1990 | Le Bihan Hervé et al. | 370/529 |
| 5,128,959 A | 7/1992 | Bruckert | 370/335 |
| 5,442,625 A | 8/1995 | Gitlin et al. | 370/342 |
| 5,737,326 A | 4/1998 | I et al. | 370/335 |
| 5,751,761 A * | 5/1998 | Gilhousen | 375/200 |
| 6,122,310 A * | 9/2000 | Ziemer et al. | 375/142 |
| 6,205,190 B1 * | 3/2001 | Antonio et al. | 375/346 |
| 6,222,875 B1 * | 4/2001 | Dahlman et al. | 375/200 |
| 6,366,588 B1 * | 4/2002 | Gans et al. | 370/468 |

FOREIGN PATENT DOCUMENTS

| | | |
|---|---|---|
| DE | 195 33 507 C2 | 3/1997 |
| WO | 96/27250 | 9/1996 |
| WO | 99/14878 | 3/1999 |

OTHER PUBLICATIONS

Patent Abstracts of Japan, vol. 1998, No. 11, Sep. 30, 1998 & JP 10 164009 A (NEC Corp), Jun. 19, 1998.

Chih–Lin I et al: "IS–95 Enhancements for Multimedia Services" Bell Labs Technical Journal, US, Bell Laboratories, vol. 1, No. 2, pp. 60–87 XP000656006 ISSN: 1089–7079 abstract p. 62, col. 1, line 7–p. 63, col. 2, line 28.

* cited by examiner

Primary Examiner—Hassan Kizou
Assistant Examiner—John Pezzlo
(74) Attorney, Agent, or Firm—Nixon & Vanderhye, PC

(57) ABSTRACT

The present invention relates to spreading data of a plurality of digital communication channels having different data rates with code sequences having different lengths. The inventive circuit allows to use a single hardware unit for spreading communication channels having different data rates, e.g. in a CDMA telecommunications system. This is achieved by processing either a single symbol and a corresponding long code in appropriate storage means for a channel with a lowest rate or to process a plurality of symbols and corresponding shorter code sequences of communication channels having higher data rates. Thus, a joint chip rate after spreading is obtained using a single hardware structure.

52 Claims, 4 Drawing Sheets

SPREADER FOR MULTIPLE DATA RATES

FIELD OF INVENTION

The present invention relates to processing data of a plurality of digital communication channels having different data rates using code sequences having different length, i.e., in a CDMA telecommunications network.

BACKGROUND OF THE INVENTION

In telecommunications systems, a large number of communication channels containing voice or data signals may be transmitted together via the same transmission medium, for example, a radio frequency band. A multitude of access schemes for placing communication channels on the transmission medium is known. A class of transmission schemes simultaneously transmits a plurality of different communication channels, e.g., in a radio frequency band, in such a way that they overlap in the time domain as well as in the frequency domain. A well-known access scheme of this class is CDMA (Code Division Multiple Access).

In order to distinguish each communication signal from other communication channel signals, each communication channel signal is encoded with one or more unique spreading codes, as this is well-known in the art. One bit of the communication channel signal (here referred to as one "symbol") is processed with one representation of a particular spreading code sequence. The spreading factor determines the length of the spreading code sequence. The spreading code sequence is often termed short code or channelization code. By spreading each of the communication channel signals, the sampling rate will thus be increased in accordance with the spreading factor. The resulting rate is referred to as "chip rate".

For spreading a particular communication channel for transmission, e.g., using CDMA, each symbol of the incoming data stream of the channel, e.g., having a logical value 1 or 0, is represented using the code sequence. For example, if the symbol has the logical value 1, the code sequence itself is transmitted, if the data symbol exhibits the logical value 0, then the inverted code sequence is transmitted or vice versa.

Thus, for a spreading factor of, e.g., 8, each symbol of the incoming data stream of the communication channel is represented by a code sequence with a length of 8 bits, usually referred to as chips. The chip rate of the communication channel after spreading therefore is a function of the spreading factor and the initial data rate of the channel.

In today's telecommunications networks, it is required to support communication channels having different data rates, for example for the transmission of voice signals or the transmission of data signals, e.g., encountered in facsimile transmissions or in communications between computers. Channels of different data rates may be conveniently supported with the above access scheme by using different spreading factors (different lengths of code sequences) for communication channels having different data rates.

Since the chip rate of each communication channel after spreading preferably is the same highest possible transmission rate, which may be processed by the system, a communication channel having a high data rate may be spread using a code sequence with a short length, whereas a communication channel having a low data rate will preferably be spread using a code sequence having a long length. With the lengths of the code sequences adapted to the data rates of the communication channels, after spreading all spread channels will have the same chip rate.

Perceivably, with the above, the code sequence with the maximum length is determined by the channel with the lowest data or symbol rate, since this channel must be spread with the highest spreading factor, or longest code sequence, respectively. Similarly, the code sequence with the minimum length is determined by the channel with the highest data or symbol rate, since this channel must be spread with the smallest spreading factor.

In a CDMA system, too, the symbol rate is linked to the spreading factor and thus to the length of the code sequence, and channels with different symbol rates require code sequences of different lengths. Representing each symbol of a channel (having a particular symbol rate) with a code sequence may, for example, be done by performing an XOR (Exclusive Or) operation on the symbol and each chip of the code sequence. When performing this operation the rate of the spread channel is increased by the spreading factor (code sequence length), as outlined before.

With the requirement of different channel data rates, as indicated before, code sequences of differing lengths need to be processed by a telecommunications system.

A straight forward, direct solution to this task is to provide dedicated hardware components for each required/provided different channel data rate, capable of processing a code sequence with a given length, the length depending on the particular data rate. However, providing such hardware for each data rate is costly and inflexible and alternative solutions are desirable.

SUMMARY OF THE INVENTION

It is therefore object of the invention to provide an apparatus and method for efficient, flexible and cost effective processing of data of a plurality of digital communication channels having different data rates.

This object is solved by an apparatus for processing data of a plurality of digital communication channels ($\phi 1$, $\phi 2$, ..., $\phi n$) having different data rates (RL, RM, RH) using code sequences having different lengths comprising: code storage means (110) for storing at least one copy of one of the code sequences; data storage means (115) for storing at least one copy of at least one symbol of one of the communication channels ($\phi 1$; $\phi 2$; ... ; $\phi n$); processing means (120) for processing the contents of the code storage means with the contents of the data storage means; wherein the number of copies of the code sequence stored in the code storage means (110) and the number of symbols of the communication channel ($\phi 1$; $\phi 2$; ... ; $\phi n$) stored in the data storage means (115) is proportional to the data rate (RL; RM; RH) of the communication channel.

The object is further solved by an apparatus for processing data of a plurality of digital communication channels ($\phi 1$, $\phi 2$, ..., $\phi n$) having different data rates (RL, RM, RH) using code sequences having different lengths, comprising: code storage means (110) for storing at least one copy of one of the code sequences; data storage means (115) for storing at least one copy of at least one symbol of one of the communication channels ($\phi 1$; $\phi 2$; ... ; $\phi n$); a select circuit (150) for selecting at least one data symbol from one of the plurality of communication channels ($\phi 1$, $\phi 2$, ..., $\phi n$) and for selecting a code sequence having a length depending on the data rate of the selected communication channel and for controlling loading the at least one symbol and the code sequence into the data and code storage means, wherein the number of copies of the code sequence stored in the code storage means (110) and the number of symbols of the communication channel (φ1; φ2; . . . ; φn) stored in the data storage means (115) is proportional to the data rate (RL; RM; RH) of the communication channel; and processing means (120) for processing the contents of the code storage means with the contents of the data storage means.

Thus, the at least one data symbol from one of the plurality of communication channels may be selected using a select circuit, further selecting a code sequence having a length corresponding to the data rate of the selected communication channel. The select circuit may advantageously control loading the at least one data symbol and the code sequence into the data and code storage means.

The object is further solved by an apparatus for processing data of a plurality of digital communication channels (φ1, (φ2, . . . , φn) having different data rates (RL, RM, RH) using code sequences having different lengths, comprising: a plurality of code storage means (110) for storing at least one copy of one of the code sequences; a plurality of data storage means (115) for storing at least one copy of at least one symbol of one of the communication channels (φ1; φ2; . . . ; φn); a plurality of processing means (120) for processing the contents of the code storage means with the contents of the data storage means; a select circuit (450) for scheduling loading at least one symbol of each of the plurality of communication channels and corresponding code sequences into the plurality of data and code storage means for parallel processing by the plurality of processing means; wherein the number of copies of the code sequence stored in the code storage means (110) and the number of symbols of the communication channel (φ1; φ2; . . . ; φn) stored in the data storage means (115) is proportional to the data rate (RL; RM; RH) of the communication channel;

The object is further solved by a method for processing data of a plurality of digital communication channels (φ1, φ2, . . . , φn) having different data rates (RL, RM, RH) using code sequences having different lengths, including the steps of: storing in code storage means (110) at least one copy of one of the code sequences, the number of copies of the code sequence being proportional to the data rate (RL; RM; RH) of the communication channel; storing in data storage means (115) at least one copy of at least one symbol of one of the communication channels (φ1, φ2, . . . , φn), the number of symbols being proportional to the data rate (RL; RM; RH) of the communication channel; and processing the contents of the code storage means with the contents of the data storage means using processing means (120).

Still further, the object is solved by a method for processing data of a plurality of digital communication channels (φ1, φ2, . . . , φn) having different data rates (RL, RM, RH) using code sequences having different lengths, including the steps of: selecting at least one data symbol from one of the plurality of communication channels (φ1; φ2; φn) using a select circuit (150); and selecting a code sequence having a length depending on the data rate of the selected communication channel; and storing in code storage means (110) at least one copy of one of the code sequences, the number of copies of the code sequence being proportional to the data rate (RL; RM; RH) of the communication channel; storing in data storage means (115) at least one copy of at least one symbol of one of the communication channels (φ1, φ2, . . . , φn), the number of symbols being proportional to the data rate (RL; RM; RH) of the communication channel; and processing the contents of the code storage means with the contents of the data storage means using processing means (120).

According to the invention, a plurality of digital communication channels having different data rates may be spread with code sequences having different length using the same hardware structure. This is achieved by providing code storage means for storing at least one representation or copy of one of the code sequences, the number of copies of the code sequence stored in the code storage means being proportional to the data rate of the corresponding communication channel and by providing data storage means for storing at least one data bit/symbol of the corresponding communication channel. The number of copies of the code sequence, the number of symbols of the communication channel stored in the data storage means is proportional to the data rate of the corresponding communication channel. This advantageously allows to use the same hardware structure for communication channels having different data rates. For a communication channel having a higher data rate and a corresponding code sequence of shorter length, a larger number of symbols of the communication channel will be stored (and processed together in one cycle of operation) in the data storage means and a correspondingly larger number of copies of the code sequence will be stored in the code storage means. Thus, in one cycle of operation either a larger number of symbols of a communication channel having a high data rate may be processed or a correspondingly lower number of symbols of a communication channel having a lower data rate.

Advantageously the code storage means may have a number of storage locations equal to a maximum code length. With this condition satisfied, the apparatus will be able to process a communication channel having a lowest data rate and a corresponding code sequence with the maximum code length thus minimizing the number of storage locations of the code storage means.

Further, the data storage means may advantageously have a number of storage locations determined by the number of storage locations of the code storage means divided by a minimum code sequence length, the minimum code sequence length corresponding to a communication channel having the highest data rate. This allows to further reduce the hardware requirements since now the data storage means is able to store the maximum number of symbols, corresponding to the processing of communication channel having the highest symbol rate, and on the other hand storing of only one symbol for the channel having the lowest symbol rate.

In a further advantageous embodiment of the invention, the different lengths of the code sequences are selected such that the number of storage locations of the code storage means is an integer multiple of all the different code lengths. This allows to seamlessly process data of communication channels with code sequences, without encountering empty storage locations (empty storage locations pose data handling problems) during processing and thus avoiding complicated control circuits.

Still further, the different lengths of the code sequences may be selected such that the after spreading the chip rates of all different communication channels are identical.

In a further advantageous embodiment of the invention, data symbols from the data storage means may selected by a circuit, for processing the symbol with the contents of a number of locations of the code storage means, the number of locations being determined by the length of the shortest code sequence. This allows to further reduce the hardware requirements, since each symbol of a communication channel will at least be processed with a number of code storage memory locations, equal to the code sequence with minimum lengths.

The communication channel signals may be represented by complex signals with real valued components, which are independently processed.

In a further advantageous embodiment of the invention, the apparatus may comprise a plurality of code storage means for storing a plurality of code sequences, a plurality of data storage means corresponding to the plurality of code storage means for storing at least one data symbol of each of a plurality of the communication channels, and a plurality of processing means for processing in parallel each of the plurality of code sequences with each of the at least one symbol of the corresponding communication channels.

Further advantageous embodiments of the invention are described in further dependent claims.

DETAILED DESCRIPTION OF EMBODIMENTS

In the following, preferred embodiments of the invention will be described with respect to FIGS. 1–4.

Figure 1:
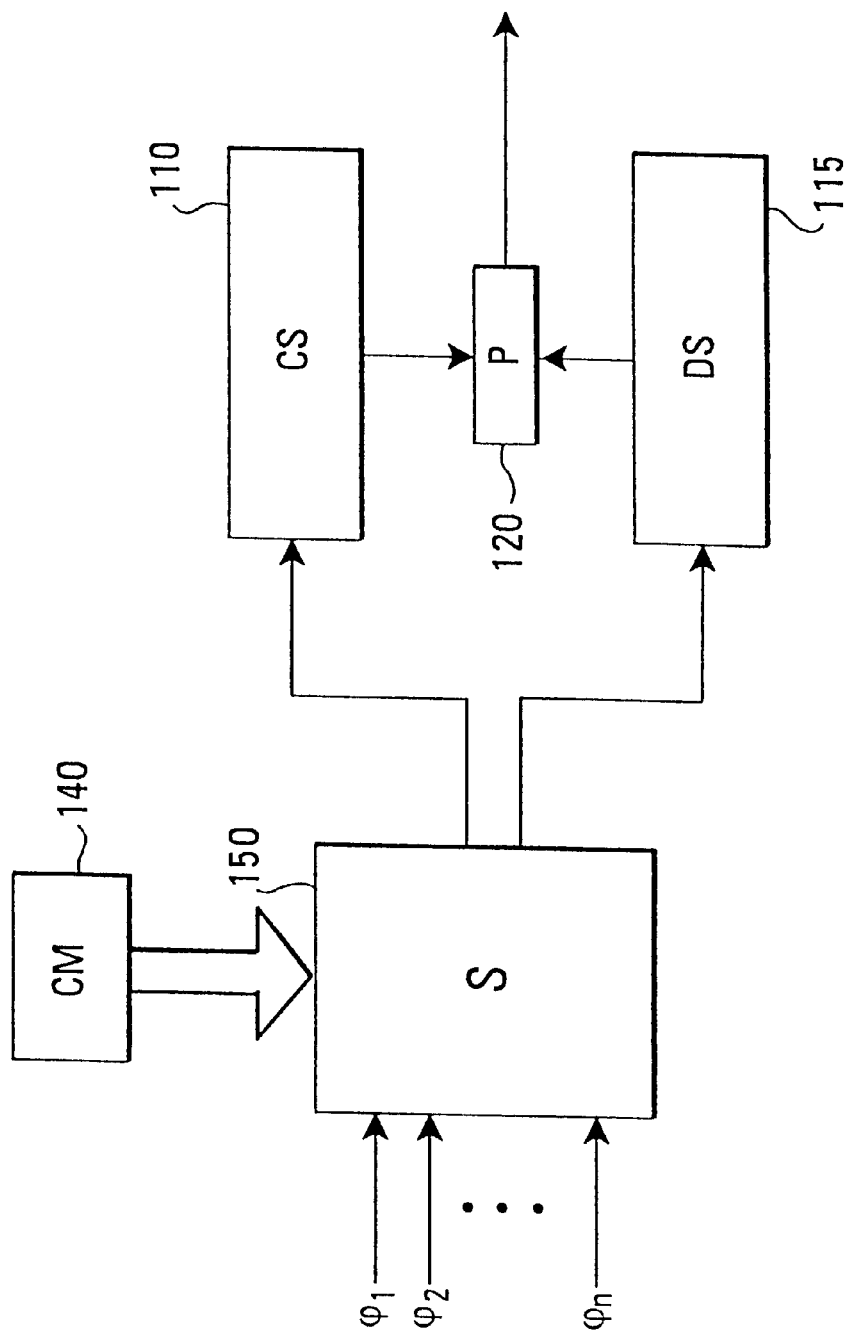
FIG. 1 shows a first embodiment of the invention for processing data of a plurality of digital communication channels having different data rates.

FIG. 1 illustrates an apparatus according to a preferred embodiment of the invention for processing data of a plurality of digital communication channels ($\phi1, \phi2, \ldots, \phi n$) having different data rates by using code sequences having different lengths.

As outlined in the introductory portion of the application, particularly in telecommunication systems using access schemes for placing a plurality of different communication channels on the same transmission medium for generating an overlap in time and frequency domain, each particular communication channel, prior to combining all communication channels, needs to be spread using a specific code sequence. After each communication channel is spread, the spread channels may be combined to a transmission signal to be transmitted, e.g. via an air interface. Such a scheme is, for example, used in CDMA (Code Division Multiple Access). The present embodiment according to the invention may be used for the above-outlined access scheme, and particularly may be used for a CDMA telecommunications system.

It is assumed that communication channels having different data rates need to be supported. Therefore, code sequences having different lengths are necessary for processing or spreading communication channels having different data rates. It is recalled that a communication channel having a lower data rate will be spread with a larger spreading factor, or equivalently, will be processed with a code sequence being comparatively longer. Likewise, a communication channel having a higher data rate will be spread with a lower spreading factor, or equivalently said, it will be spread using a code sequence having a comparatively shorter length. After spreading, all individual channels having different initial data rates will have the same chip rate. This chip rate may be determined by the characteristics of the data communications system or by other factors, e.g. telecommunications standard.

The present embodiment according to the invention will preferably be used in a telecommunications system having the above-outlined access scheme, in particular a CDMA telecommunications system, however, the invention according to the present embodiment may equally well be applied to any system requiring processing of channels having different data rates.

It is a basic idea of the invention to employ a single spreading/processing hardware unit to process a plurality of communication channels having different data rates and thus requiring different spreading factors.

As shown in FIG. 1, this may be achieved by providing code storage means 110, for storing at least one representation or copy of one of the code sequences. The number of copies or representations of code sequences which may be stored in the code storage means will be determined by the number of storage locations, respectively of the code storage means.

Further, the hardware structure of FIG. 1 is provided with data storage means 115 for storing at least one data symbol of one of the plurality of communication channels $\phi1, \phi2, \ldots, \phi n$, the number of symbols of the communication channels to be stored in the data storage means being determined by the data rate of the channel. The code storage means and data storage means may, e.g., be constituted by registers.

Further, the arrangement of FIG. 1 is provided with processing means 120 for processing the contents of the code storage means with the contents of the data storage means. The output of the processing means 120 may be supplied to further components of a telecommunications system, such as a CDMA telecommunications system. In the current embodiment, the processing means preferably sequentially processes contents of the code storage means with contents of the data storage means and therefore the output of the processing means preferably is a serial data stream. The processing means may perform an XOR (Exclusive Or) operation, as it may, for example, be preferred in a CDMA-communications system.

Therefore, the processing means 120 may only consist of appropriate logic elements (XOR) providing the appropriate spreading function, in order to represent a symbol with the logical value 1 by the code sequence stored in the code storage means, and to represent a symbol having the logical value 0 with the inverted code sequence, or vice versa.

Further, the arrangement of FIG. 1 comprises a select circuit 150 for sequentially selecting at least one data symbol from each of the plurality of communication channels, $\phi1, \phi2, \ldots, \phi n$ and for selecting a corresponding code sequence having a length corresponding to the data rate of the selected communication channel, and for controlling loading the at least one symbol of the communication channel and the code sequence into the data storage means 115 and code storage means 110. A plurality of copies of the same symbol and the same code sequence may be loaded into the code storage means, depending on the data rate of the channel.

Different code sequences may be stored in a code sequence memory 140 indicated in FIG. 1. This code sequence memory 140 may contain all possible code sequences of all different lengths provided. The code sequence memory 140 may preferably store a plurality of groups of code sequences having different lengths. For each particular code length, a plurality of different orthogonal code sequences may be provided.

Thus, the select circuit 150, upon selection of one of the communication channels φ1, φ2; ..., φn, will preferably select one of the code sequences having a length corresponding to the data rate of the selected channel and will provide at least one copy/representation of the code sequence from the code sequence memory 140 to the code storage means 110. The select circuit, at the same time, will provide at least one copy of each of a number of data symbols of the selected communication channel to the data storage means 115, the number of symbols and copies being determined by the data rate of the channel. Preferably, the number of symbols and the number of copies of each symbol are reciprocal to each other.

It is noted that the plurality of communication channels φ1, φ2, ..., φn having different data rates may be individually represented by complex signal components, such as they are obtained if a quadrature amplitude modulation (QAM) or a phase shift keying (PSK) technique is employed as a digital modulation scheme. If such modulation schemes are applied, an in-phase and a quadrature component signal is produced for each communication channel. QAM and PSK are well-known in the art. The in-phase and quadrature component signals associated with each of the communication channel may then individually be encoded using code sequences as above. Thus, the individual complex components of the plurality of communication channels φp, φ2, ..., φn may individually be processed by the circuit arrangement of FIG. 1. Therefore, the in-phase signal component or the quadrature signal component of a particular communication channel may in one cycle of operation be selected by the select circuit 150 and the predetermined number of symbols, depending on the data rate of the communication channel, may be loaded into the data storage means. Correspondingly, a suitable code sequence may be selected from the code sequence memory 140 and stored in the code storage means 110. After processing by the processing means 120, any other communication channel or any other in-phase signal component or quadrature signal component may be selected for the next cycle of operation.

In the following, the operation of the apparatus according to the preferred embodiment of the invention according to FIG. 1 will be outlined in detail.

In a first step, one of the plurality of communication channels (φ1, φ2, ..., φn is selected for a spreading or processing cycle of operation. A cycle of operation essentially includes representing a predetermined number of symbols of the selected communication channel by the code sequence or the inverted code sequence, as outlined above. The number of symbols processed in one operation is determined by the data rate of the selected channel and will be further outlined with respect to FIG. 2.

The selection of the one of the plurality of communication channels may be performed by the select circuit 150 according to a predetermined scheme, preferably allowing processing all provided communication channels (φ1, φ2, ..., φn without any delay. This may involve cyclically choosing each one of the communication channels in a predetermined sequence. Providing a cyclical selection of all communication channels may be appropriate to process all data of all communication channels, since all communication channels will be operated on with the same frequency. And operating on each communication channel with the same frequency will in turn provide a uniform chip rate after spreading for all different communication channel rates, since for a communication channel having a high data rate, a larger number of symbols may be simultaneously processed in one cycle of operation, whereas for a communication channel having a lower data rate a smaller number of symbols of the communication channel will be simultaneously processed in one cycle of operation. For the communication channel having the lowest data rate only one data symbol may be processed during one cycle of operation. However, any other scheme for selecting the communication channels may be employed instead.

After a communication channel has been selected, in a second step, an appropriate code sequence must be selected. The code sequence may be determined by the select circuit 150, and be retrieved from the code sequence memory 140. As outlined before, the length of the selected code sequence will be determined according to the data rate of the selected communication channel. For a communication channel having a higher data rate, a code sequence having shorter length will be selected, and likewise, for a communication channel having a lower data rate, a code sequence having a longer length will be selected. Equivalently said, for a communication channel having a high data rate, a low spreading factor is required, whereas for a communication channel having a low data rate a higher spreading factor will be required in order to obtain a joint chip rate for all communication channels after the spreading or processing operation.

After this second step of determining the code sequence having an appropriate length, in a third step an appropriate number of data symbols of the selected communication channel is determined. The number of data symbols of the selected communication channel chosen for transfer to the data storage means 115 is also dependent on the data rate of the selected communication channel. This at least one data symbol is transferred to the data storage means 115, and, at the same time, the selected code sequence is transferred to the code storage means 110, preferably by the select circuit 150.

Naturally, since the code storage means 110 will have a finite number of storage locations, only a certain number of copies of the selected code sequence may be stored in the code storage means 110. Correspondingly, the number of storage locations of the data storage means 115 will be appropriately chosen, in order to be able to store as many subsequent data symbols of the communication channel, as copies of the selected code sequence can be stored in the code storage means 110.

Thus, if for example three copies of the selected code sequence for a particular communications channel may be stored in the code storage means 110, preferably 3 (preferably sequential) data symbols of the selected communication channel may be transferred to the data storage means 115. Similarly, if only one copy of the selected code sequence may be stored in the code storage means, preferably only one data symbol of the selected communication channel will be transferred to the data storage means 115. Thus, the code storage means 110 will store a number of copies of the code sequence being proportional to the data rate of the selected communication channel and the data storage means will store a number of symbols of the selected communication channel being also proportional to the data rate of the selected communication channel.

However, in order to match variable numbers of different (preferably sequential) symbols stored in the data storage means 115 with the particular length and number of copies of the code sequences stored in the code storage means 110, several copies of the at least one selected symbol of the selected communication channel will be stored in the data storage means 115. For example, if a smaller number of copies of the code sequence is stored in the code storage means 110, a larger number of copies of each selected data symbol of the communication channel is stored in the data storage means 115.

After storing the appropriate number of copies of the at least 1 selected symbol of the communication channel and the appropriate number of copies of the corresponding code sequence, in a fourth step, the processing means 120 processes the contents of the code storage means 110 with the contents of the data storage means 115.

The processing means 120 may, for example, process each one location of the code storage means 110 with each one location of the data storage means 115, or, the processing means 120 may respectively process the content of a plurality of locations of the code storage means 110 with the contents of one of the locations of the data storage means 115. The latter may be sufficient, since, as outlined in the introductory portion of the application, each single symbol of the data stream of a communication channel is represented using the selected code sequence. Therefore, the number of locations of the code storage means 110 used for processing with the contents of a single location of the data storage means 115 may be equal to the length of the code sequence or group of code sequences having the shortest length. This allows to reduce hardware requirements, since an accordingly smaller number of locations is required for the data storage means 115.

The processing means 120 preferably processes the contents of the code storage means and the contents of the data storage means in a XOR (exclusive or) operation or any other logical operation. The XOR operation is especially advantageous in case of a CDMA-telecommunications system, in order to provide an appropriate spreading of the communication channels.

In the following, with respect to FIG. 2, a further embodiment of the invention for spreading data of a plurality of digital communication channels having different data rates using code sequences having different lengths will be described. In this embodiment of FIG. 2, preferred numbers of storage locations of the code storage means and the data storage means and additional hardware components will be described, allowing a further reduction of the hardware requirements.

As outlined with respect to the previous embodiment, a number of copies of the code sequence will be stored in the code storage means 115, the number of copies being determined by the data rate of the selected communication channel. Likewise, a number of symbols of the selected communication channel, preferably sequential symbols of the data stream of the selected communication channel, will be stored in the data storage means 110. The number of symbols of the communication channel and the number of copies of the selected code sequence will, according to the present embodiment, be the same. This allows to optimally utilize hardware components provided for the apparatus according to the invention.

As outlined in the introductory portion of the application, different communication channels having different data rates must be supported. Therefore, code sequences for spreading the individual communication channels having different data rates will be provided. The communication channel having the lowest data rate RL accordingly must be processed with a code sequence having a maximum length, or equivalently said, must be spread with the highest spreading factor. Therefore, according to the embodiment described with respect to FIG. 2, the code storage means 110 will have a number of storage locations equal to the maximum code sequence length MaxL to be used for communication channels with the lowest data rate RL. This allows to avoid any empty storage locations and therefore avoids any undefined samples in the output data stream of the processing means 120. Empty storage locations pose data handling problems.

Figure 2:
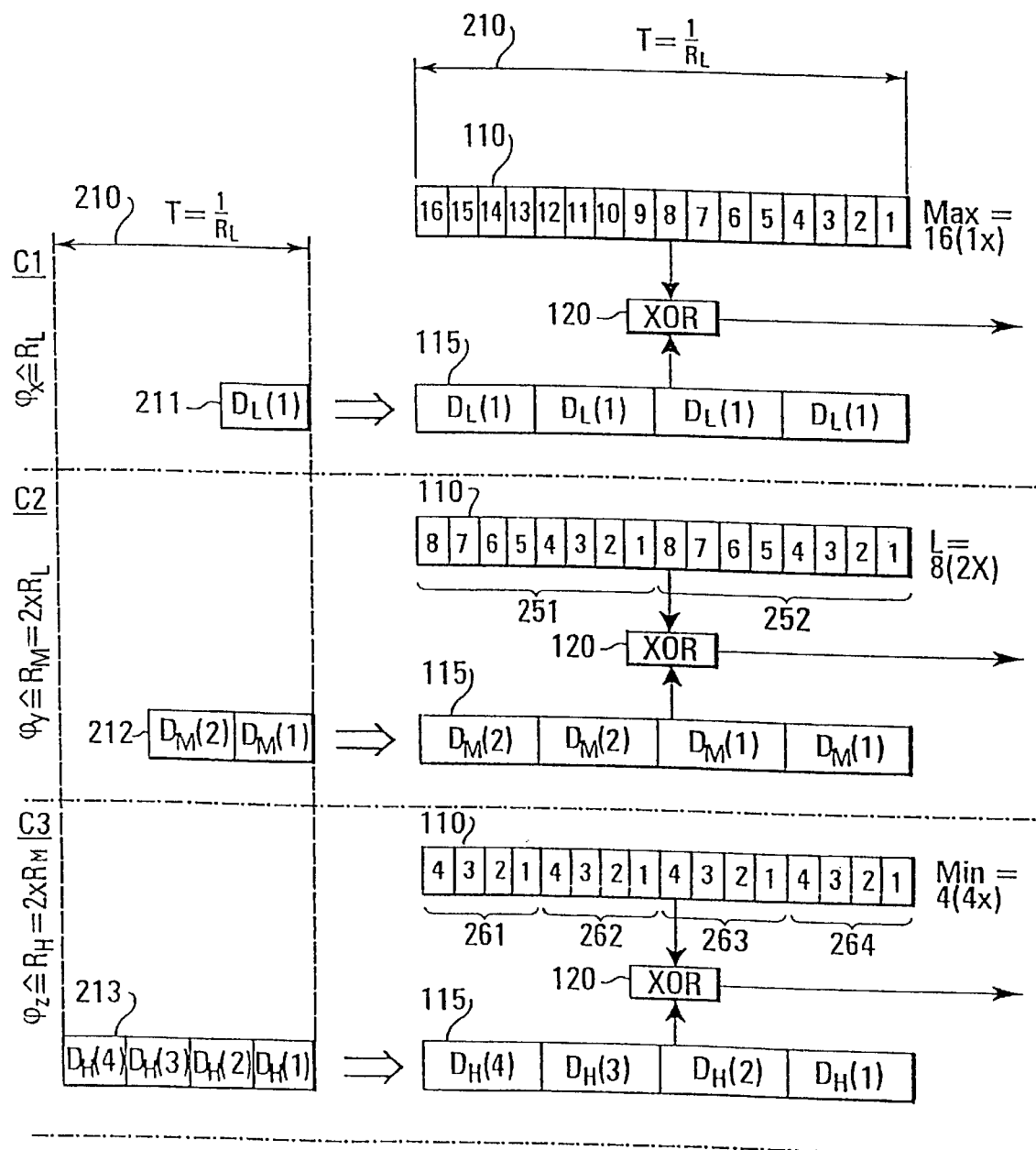
FIG. 2 shows an embodiment of the invention, illustrating processing communication channels having different data rates.

Further, for most efficiently utilizing hardware components provided, according to the present embodiment of FIG. 2, the number of storage locations of the data storage means 115 is reduced to a minimum. Since, as outlined in detail before, each symbol of the data stream of the communication channels needs to be represented using the code sequence, the data storage means requires a single data storage location content for each predetermined number of contents of locations of the code storage means 110. Obviously, since a communication channel with the highest data rate RH and correspondingly shortest code sequence needs to be processed, the minimum number of locations of the code storage means for one specific data symbol of the communications channel with the rate RH must be equal to the length of the shortest code sequence. If this condition is satisfied, any other longer code sequence may be taken care of by storing copies of the selected symbols in neighboring storage locations of the data storage means 115. According to the above, the data storage means in the present embodiment will preferably have a number of storage locations being determined by the number of storage locations of the code storage means divided by a minimum code sequence length MinL.

As before, with respect to the code storage means 110, this allows to avoid any empty storage locations in the data storage means 115, thus avoiding any undefined bits in the output data stream of processing means 120.

It was outlined above, how the number of storage locations of the code storage means 110 and the number of storage locations of the data storage means 115 may appropriately be chosen depending on the maximum code sequence length MaxL and the minimum code sequence length MinL, in order to avoid any empty storage locations. However, this does not yet avoid empty storage locations in case code sequences of intermediate lengths for communication channels of intermediate data rates, that is with data rates inbetween the highest data rate RH and the lowest data rate RL are to be processed. Therefore, according to the embodiment of the invention according to FIG. 2, the different lengths of the code sequences are selected such that the number of storage locations of the code storage means 110 is an integer multiple of all different code length. Thus it is assured that an integer number of copies of all different code sequences will seamlessly fit into the code storage means 110 at adjacent locations. Consequently empty storage locations do not occur and, since an appropriate number of locations are provided for the data storage means 115, the output data stream of the processing means 120 will not exhibit any "gaps" or undefined samples.

After this theoretical explanation and description of an optimum choice for the number of locations of the code and data storage means according to the invention, with respect to FIG. 2, three examples for three different communication channels having three different data rates will be outlined.

In a section C1 in FIG. 2, a processing example for a communication channel having the lowest allowable data rate RL is shown. In a section C2 the processing of a communication channel having an intermediate data rate RM is illustrated and in a section C3 of FIG. 2, the processing of a communication channel having the highest allowable data rate RH is shown. It is assumed that RL: lowest rate RM: 2*RL, double rate of RL, RH: 4*RL, highest rate, MaxL=16 bit (chips), MinL=4 bit, and correspondingly, the length of the code sequence of communication channel having the medium data rate RM is 8 bits (chips).

Each of the sections shows code storage means 110, data storage means 115 and processing means 120, as outlined with respect to FIG. 1. The processing means 120 may perform a XOR operation or any other logical operation on the contents of the data and code storage means. A select circuit (not shown) may perform scheduling and loading operations as outlined with respect to FIG. 1.

Reference sign 210 illustrates a time period required for one cycle of operation of the hardware arrangement. One cycle of operation may comprise the four steps of operation, as outlined with respect to FIG. 1. T stands for the time period required for one cycle of operation, which is equal to the inverse data rate RL of the communication channel with the lowest data rate. This time period for one cycle of operation is necessary, since in one cycle of operation an entire code sequence needs to be processed with a symbol of the data stream of the selected communication channel.

In the following, operations for processing a data symbol DL(1) of a communication channel φx having the lowest possible data rate RL will be outlined. The communication channel φx will be processed with a code sequence having the maximum length MaxL which in the present example be 16 chips. Since the number of storage locations of the code storage means 110 is determined by the length of the code sequence having the maximum length MaxL, a single copy of the code sequence corresponding to communication channel φx will be loaded into the code storage means 110. The individual code storage locations are denoted by integers in descending order. Further, since only a single copy of the code sequence is stored in the code storage means, copies of the symbol DL(1) will be loaded to all four storage locations of the data storage means 115.

The data storage means may have a number of locations equal to the number of locations of the code storage means, however, as outlined before, preferably, a smaller number of data storage locations may be provided instead, the number being determined by the total number of storage locations of the code storage means divided by the minimum code length MinL, and thus. Thus, in the present example the number of locations of the data storage means may be 4 locations.

After data sample or data symbol DL(1) of communication channel φx having data rate RL is stored at all 4 locations of the data storage means, the processing means processes the contents of the storage locations of the code storage means 110 with the contents of the data storage means 115, as it was outlined before. Preferably a data stream representing the code sequence or the inverse of the code sequence, as appropriate, depending on the data symbol of the incoming data stream DL(1) will be output by the processing means 120. This completes one cycle of operation of the inventive apparatus for spreading a communication channel having the lowest possible data rate RL.

In the following, with respect to reference sign C2, a cycle of operation for processing two symbols DM(1), DM(2) of a communication channel φy having an intermediate data rate RM, being double the data rate RL will be described. In this case, since the data rate RM is equal to 2 RL, the code sequence will have a length of 8 chips, and two copies of the code sequence may be stored in the code storage means 110. Correspondingly two data symbols DM(2) and DM(1) of the incoming data stream of communication channel φy will be stored in the data storage means 115. Since four locations are provided for the data storage means, two copies of each of the data symbols DM(2) and DM(1) will be stored at the four data storage locations provided by the data storage means 115.

The copies of the data samples DM(2) will preferably be stored on the left most two locations of the data storage means 115 in order to match the left hand copy of the code sequence stored in the code storage means 110, denoted 251. The two copies of the data sample DM(1) will preferably be stored at the two right most locations of the data storage means 115, in order to match the right hand copy of the code sequence, denoted 252. Accordingly, in this cycle of operation for the data channel φy having the intermediate data rate RM, two data symbols may be processed together in one cycle.

In the following, with respect to reference sign C3, a cycle of operation for a data channel φz having the highest possible data rate RH will be described. In this case, the corresponding code sequence will have a length of 4 chips, and thus, four copies 261, 262, 263 and 264 may be stored in the code storage means 110. Correspondingly, four symbols DH(1), DH(2), DH(3), DH(4) may be stored in the data storage means 115. The order of the symbols of the data stream DH(1)–DH(4) will preferably be chosen such that the output of the processing means 120 provides a serial data stream, corresponding to the correct sequence of symbols of the incoming data stream of channel φz. As to be seen at reference sign 213, four different samples will be processed together in one cycle of operation.

The embodiment of FIG. 2 will provide at the output of the processing means 120 a joint chip rate of 16×RL (or 8×RM or 4×RH) for all different channels as it becomes obvious with the above description.

The above proceeding of doubling the symbol rate as explained with respect to FIG. 1 can, of course, be repeated until the highest theoretical symbol rate is reached, in which case the spreading factor is 1. It is further noted that arbitrary lengths MinL and MaxL and an arbitrary number of different data rates may be chosen. For example it may be required to provide 64 channels of any symbol rate from a set of 32/64/128/256/512/1024 ksps (kilo symbols per second) in any mixture. MinL may be 16 chips, MaxL may be 128 chips for a chip rate of 4.096 Mcps (mega chips per second).

In the straight forward approach outlined in the introductory section of the application, the following number of spreading units is needed:

64 channels of 32 ksps 64 channels of 64 ksps 64 channels of 128 ksps 64 channels of 256 ksps 64 channels of 512 ksps 64 channels of 1024 ksps

- - -

384 spreading units in total

As opposed to that, the present invention allows to use hardware components shared for all different symbol rates, i.e. to process code sequences having different lengths. In terms of the above example only 64 spreading units are needed, amounting to a reduction in hardware by 84%.

Figure 3:
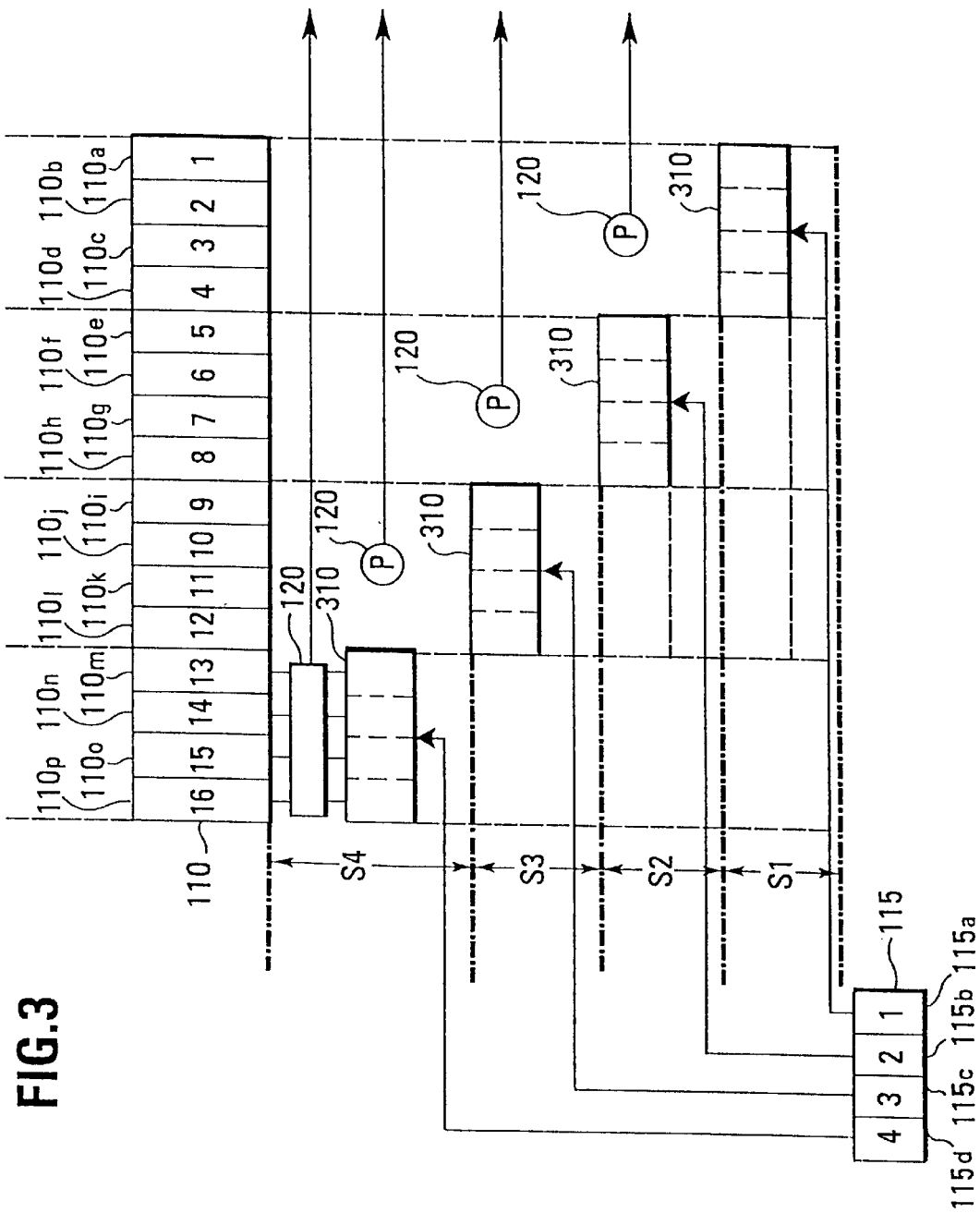
FIG. 3 shows another embodiment of the invention, illustrating a time sequence of steps during processing a code sequence with data bits of a communication channel.

In the following, with respect to FIG. 3, a further embodiment of the invention will be described. FIG. 3 further illustrates the specific sequence of processing steps for one cycle of operation.

FIG. 3 shows code storage means 110, having 16 locations, as denoted by integers in descending order. Further, FIG. 3 shows a hold circuit 310 for latching a data symbol from a selected communication channel received from the data storage means 115 and for allowing processing the symbol with the contents of a number of locations of the code storage means 110, whereby the number of the hold circuit storage locations is equal to the code sequence having minimum length. Instead of providing a hold circuit, the data symbols may directly be read out from a memory, e.g., by repeatedly selecting the same memory location. As before, with respect to FIG. 2, it is assumed that the maximum length MaxL of a code sequence is 16 chips and the minimum length MinL of a code sequence is 4 chips. Therefore, the data storage means 115 preferably comprises 4 storage locations and the hold circuit 310 comprises one location.

Essentially it needs to be assured that 4 code storage locations can be processed by the processing means with the contents of the hold circuit, since the code sequence with minimum length has 4 chips.

It is noted that the specific examples for the size of the storages and the code sequences is chosen for illustration purposes only, any other numbers are principally possible, as long as the inventive conditions outlined above are satisfied.

In the following, with respect to FIG. 3, the four steps S1, S2, S3, S4 during one cycle of operation of the inventive circuit will be described.

In a first step S1 the contents of a data storage location denoted 115a will be transferred to the hold circuit 310. Subsequently, the processing means will process the contents of the code storage locations 110a, 110b, 110c, 110d (one after another) with the contents of the hold circuit, being the data symbol transferred from location 115a of data storage means 115.

Subsequently, in a step S2, the contents of a data storage location 115b will be transferred to the hold circuit 310, and, as outlined with respect to step S1, contents of code storage locations 110e, 110f, 110g, 110h will be processed with the contents of the hold circuit. Similarly it is proceeded in step S3, where the contents of a data storage location 115c is transferred to the hold circuit 310 and correspondingly processed with the contents of the next 4 code storage locations.

And further, similar to the steps above, in step S4, the contents from a data storage location 115d are transferred to the hold circuit 310 accordingly processed with the contents of the last 4 code storage locations. All processing results are preferably output in a serial data stream, corresponding to the order of the input data.

In the example of FIG. 3, in case a data channel with the lowest possible data rate RL is processed at all 4 data storage locations 115a, 115b, 115c and 115d the same data symbol of the selected data channel will be stored. Correspondingly, an appropriate processing with the corresponding code sequence having 16 chips is possible. In case a communication channel having the highest possible data rate RH is processed, four symbols will be stored at data storage locations 115a, 115b, 115c and 115d. Correspondingly, four identical copies of a code sequence with a length of 4 chips each will appropriately be stored in code storage means 110, providing the correct processing. In case a communication channel having the medium data rate RM is processed, at data storage location 115a, and 115b the same (first) data symbol will be stored, and similarly, at data storage location 115c, 115d the second data symbol of the selected communication channel will be stored.

Similarly, in further embodiments, for any possible maximum, intermediate and minimum data rate an appropriate number of symbols or copies of symbols may be stored in the data storage means.

Even though only examples with three different data rates RL, RM and RH were outlined, a plurality of further data rates is possible, provided the constraints according to the invention are fulfilled. For example, in case the maximum code length is 128, code sequences of length 64 chips, 32 chips, 16 chips, 8 chips, 4 chips and 2 chips may be provided.

In the foregoing description it was described, how a single spreading hardware unit could be employed to process either a single symbol and a corresponding "long" code sequence for a channel with the lowest rate, or to process a plurality of symbols and the corresponding shorter code sequences for channels of higher data rates. For example, channels of 32 ksps, 64 ksps, 128 ksps, 256 ksps, 512 ksps and 1024 ksps could be processed by the same hardware structure. Basically, any number of different data rates is possible.

In the following, with respect to FIG. 4 a further embodiment of the invention will be described.

Figure 4:
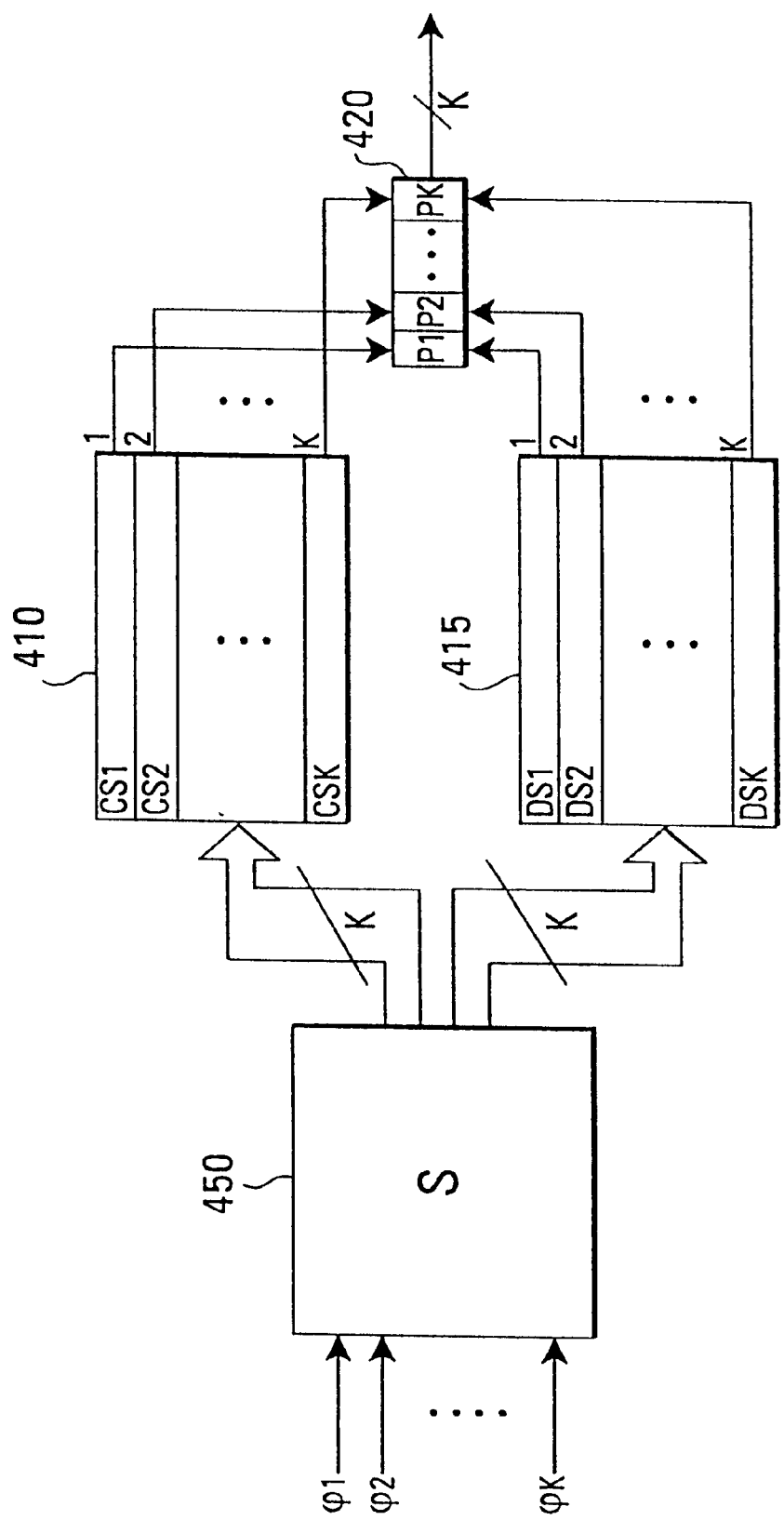
FIG. 4 shows a further embodiment of the invention illustrating a hardware arrangement for processing a plurality of communication channels having different data rates in parallel.

FIG. 4, similarly to FIG. 1 shows processing elements for spreading communication channels, however, deviating from FIG. 1, the embodiment of FIG. 4 is adapted to process a plurality of communication channels in parallel. A parallel processing allows to further increase the processing speed of the device, since communication channels or respective in-phase and quadrature components can be processed simultaneously and be combined to a single transmission signal without any intermediate buffering, etc.

FIG. 4 shows K communication channels ($\phi$1, $\phi$2, ..., $\phi$k, a select circuit 450, and a code storage means 410 comprising K parallel code storage units CS1, CS2, ..., CSK for storing, as outlined before, appropriate numbers of copies of each of K different code sequences. Further, FIG. 4 displays data storage means 415 comprising K parallel data storage units DS1, DS2, ..., DSK for storing appropriate numbers/copies of symbols from the K communication channels. Processing means 420 comprising K processing units P1, P2, ..., PK for parallel processing of the contents of corresponding code storage units and data storage units are provided.

The inventive circuit according to FIG. 4 is able to process K channels in parallel, as it will be outlined in the following.

Data streams containing data symbols of each of the different communication channels, as for example outlined with respect to FIG. 1, are received at the select circuit 450. The select circuit is connected via K parallel lines to the code storage means 410 for loading appropriate numbers of copies of individual code sequences into the K code storage units. The select circuit is further connected via K parallel lines to the data storage means 415 for loading appropriate numbers and copies, respectively, of symbols of each of the communications channels into the K data storage units. Following, each of the processing units P1, P2, ... PK now processes the contents of one code storage unit and the corresponding data storage unit, as outlined before. Thus, since K processing units are provided, all K channels may be processed in parallel and K parallel data stream are output from processing means 420, which then may be combined in a combiner (not shown).

What is claimed is:

1. Apparatus for processing data of a plurality of digital communication channels ($\phi$1, $\phi$2, ..., $\phi$n) having different data rates (RL, RM, RH) using code sequences having different lengths, comprising:

code storage means (110) for storing at least one copy of one of the code sequences;

data storage means (115) for storing at least one copy of at least one symbol of one of the communication channels (φ1; φ2; . . . ; φn);

processing means (120) for processing the contents of the code storage means with the contents of the data storage means; wherein the number of copies of the code sequence stored in the code storage means (110) and the number of symbols of the communication channel (φ1; φ2; . . . ; φn) stored in the data storage means (115) is proportional to the data rate (RL; RM; RH) of the communication channel.

2. Apparatus according to claim 1, wherein the code storage means (110) has a number of storage locations equal to a maximum code sequence length (MaxL).

3. Apparatus according to claim 1, wherein the data storage means (115) has a number of storage locations determined by the number of storage locations of the code storage means (110) divided by a minimum code sequence length (MinL).

4. Apparatus according to claim 1, wherein the different lengths of the code sequences are selected such that the number of storage locations of the code storage means (110) is an integer multiple of all different code lengths.

5. Apparatus according to claim 1, wherein the individual lengths of the code sequences are selected such that after processing the chip rates of all different communication channels are identical.

6. Apparatus according to claim 1, wherein complex-valued communication channels (φ1, φ2, . . . , φn) are represented by real-valued components, which are independently processed.

7. Apparatus according to claim 1, wherein the processing means (120) performs an XOR operation.

8. CDMA-communication system, comprising the apparatus according to claim 1.

9. Apparatus for processing data of a plurality of digital communication channels (φ1, φ2, . . . , φn) having different data rates (RL, RM, RH) using code sequences having different lengths, comprising:

code storage means (110) for storing at least one copy of one of the code sequences;

data storage means (115) for storing at least one copy of at least one symbol of one of the communication channels (φ1; φ2; . . . ; φn);

a select circuit (150) for selecting at least one data symbol from one of the plurality of communication channels (φ1, φ2, . . . , φn) and for selecting a code sequence having a length depending on the data rate of the selected communication channel and for controlling loading the at least one symbol and the code sequence into the data and code storage means, wherein the number of copies of the code sequence stored in the code storage means (110) and the number of symbols of the communication channel (φ1; φ2; . . . ; φn) stored in the data storage means (115) is proportional to the data rate (RL; RM; RH) of the communication channel; and processing means (120) for processing the contents of the code storage means with the contents of the data storage means.

10. Apparatus according to claim 9, wherein the code storage means (110) has a number of storage locations equal to a maximum code sequence length (MaxL).

11. Apparatus according to claim 9, wherein the data storage means (115) has a number of storage locations determined by the number of storage locations of the code storage means (110) divided by a minimum code sequence length (MinL).

12. Apparatus according to claim 9, wherein the different lengths of the code sequences are selected such that the number of storage locations of the code storage means (110) is an integer multiple of all different code lengths.

13. Apparatus according to claim 9, wherein the individual lengths of the code sequences are selected such that after processing the chip rates of all different communication channels are identical.

14. Apparatus according to claim 9, wherein complex-valued communication channels (φ1, φ2, . . . , φn) are represented by real-valued components, which are independently processed.

15. Apparatus according to claim 9, wherein the processing means (120) performs an XOR operation.

16. CDMA-communication system, comprising the apparatus according to claim 9.

17. Apparatus for processing data of a plurality of digital communication channels (φ1, φ2, . . . , φn) having different data rates (RL, RM, RH) using code sequences having different lengths, comprising:

a plurality of code storage means (110) for storing at least one copy of one of the code sequences;

a plurality of data storage means (115) for storing at least one copy of at least one symbol of one of the communication channels (φ1; φ2; . . . ; φn);

a plurality of processing means (120) for processing the contents of the code storage means with the contents of the data storage means;

a select circuit (450) for scheduling loading at least one symbol of each of the plurality of communication channels and corresponding code sequences into the plurality of data and code storage means for parallel processing by the plurality of processing means; and wherein the number of copies of the code sequence stored in the code storage means (110) and the number of symbols of the communication channel (φ1; φ2; . . . ; φn) stored in the data storage means (115) is proportional to the data rate (RL; RM; RH) of the communication channel.

18. CDMA-communication system, comprising the apparatus according to claim 17.

19. Method for processing data of a plurality of digital communication channels having different data rates using code sequences having different lengths, comprising:

storing in first memory at least one copy of one of the code sequences, the number of copies of the code sequence being proportional to the data rate of the communication channel;

storing in second memory at least one copy of at least one symbol of one of the communication channels, the number of symbols being proportional to the data rate of the communication channel; and processing the contents of the first and second memories.

20. Method according to claim 19, wherein the first memory has a number of storage locations equal to a maximum code sequence length.

21. Method according to claim 19, wherein the second memory has a number of storage locations determined by the number of storage locations of the first memory divided by a minimum code sequence length.

22. Method according claim 19, wherein the different lengths of the code sequences are selected such that the number of storage locations of the first memory is an integer multiple of all different code lengths.

23. Method according to claim 19, wherein the different lengths of the code sequences are selected such that the after processing the chip rates of all different communication channels are identical.

24. Method according to claim 19, further comprising:
selecting a data symbol in the second memory; and
processing the symbol with the contents of a number of locations of the first memory, the number of locations being determined by the code sequence with minimum length.

25. Method according to claim 19, wherein the complex-valued communication channels are represented by real-valued components, which are independently processed.

26. Method according to claim 19, wherein the processing includes performing an XOR operation.

27. Method according to claim 19, further comprising:
storing a plurality of code sequences in a plurality of first memories;
storing at least one data symbol of each of the plurality of the communication channels in a plurality of second memories; and
processing in parallel each of the plurality of code sequences with the at least one symbol of each of the corresponding communication channels.

28. Method according to claim 19, wherein the processing includes processing the contents of one location of the second memories with the contents of a number of locations of the first memories, the number of locations of the first memories processed with the one location of the second memories is equal to the length of the code-sequence having the shortest length.

29. Method for processing data of a plurality of digital communication channels having different data rates using code sequences having different lengths, comprising:
selecting at least one data symbol from one of the plurality of communication channels; and
selecting a code sequence having a length depending on the data rate of the selected communication channel; and
storing in a first memory at least one copy of the code sequence, the number of copies of the code sequence being proportional to the data rate of the communication channel;
storing in a second memory at least one copy of the at least one symbol of one of the communication channels, the number of symbols being proportional to the data rate of the communication channel; and
processing the contents of the first and second memories.

30. Method according to claim 29, wherein the first memory has a number of storage locations equal to a maximum code sequence length.

31. Method according to claim 29, wherein the second memory has a number of storage locations determined by the number of storage locations of the first memory divided by a minimum code sequence length.

32. Method according to claim 29, wherein the different lengths of the code sequences are selected such that the number of storage locations of the first memory is an integer multiple of all different code lengths.

33. Method according to claim 29, wherein the different lengths of the code sequences are selected such that the after processing the chip rates of all different communication channels are identical.

34. Method according to claim 29, further comprising:
selecting a data symbol in the second memory, and
processing the symbol with the contents of a number of locations of the first memory, the number of locations being determined by the code sequence with minimum length.

35. Method according to claim 29, wherein the complex-valued communication channels are represented by real-valued components, which are independently processed.

36. Method according to claim 29, wherein the processing includes performing an XOR operation.

37. Method according to claim 29, wherein the processing includes processing the contents of one location of the second memory with the contents of a number of locations of the first memory, the number of locations of the first memory processed with the one location of the second memory is equal to the length of the code-sequence having the shortest length.

38. Apparatus for processing data of a plurality of digital communication channels having different data rates using code sequences having different lengths, comprising:
a first memory for storing at least one copy of one of the code sequences;
a second memory for storing at least one symbol of one of the communication channels; and
a processor for processing contents of the first and second memories;
wherein a number of copies of the code sequence stored in the first memory and a number of symbols of the communication channel stored in the second memory is proportional to the data rate of the communication channel.

39. Apparatus according to claim 38, wherein the first memory has a number of storage locations equal to a maximum code sequence length.

40. Apparatus according to claim 38, wherein the second memory has a number of storage locations determined by the number of storage locations of the first memory divided by a minimum code sequence length.

41. Apparatus according to claim 38, wherein the different lengths of the code sequences are such that the number of storage locations of the first memory is an integer multiple of all different code lengths.

42. Apparatus according to claim 38, wherein the individual lengths of the code sequences are such that after processing, the chip rates of all different communication channels are identical.

43. Apparatus according to claim 38, wherein complex-valued communication channels are represented by real-valued components, which are independently processable.

44. Apparatus according to claim 38, wherein the processor is configured to perform an XOR operation.

45. Apparatus for processing data of a plurality of digital communication channels having different data rates using code sequences having different lengths, comprising:
a first memory for storing at least one copy of one of the code sequences;
a second memory for storing at least one copy of at least one symbol of one of the communication channels;
electronic circuitry configured to select at least one data symbol from one of the plurality of communication channels, select a code sequence having a length depending on the data rate of the selected communication channel, and control loading the at least one symbol and the code sequence into the first and second memories, wherein a number of copies of the code sequence stored in the first memory and a number of symbols of the communication channel stored in the second memory are proportional to a data rate of the communication channel; and a processor for processing contents of the first and second memories.

46. Apparatus according to claim 45, wherein the first memory has a number of storage locations equal to a maximum code sequence length.

47. Apparatus according to claim 45, wherein the second memory has a number of storage locations determined by the number of storage locations of the first memory divided by a minimum code sequence length.

48. Apparatus according to claim 45, wherein the different lengths of the code sequences are such that the number of storage locations of the first memory is an integer multiple of all different code lengths.

49. Apparatus according to claim 45, wherein the individual lengths of the code sequences are such that after processing, the chip rates of all different communication channels are identical.

50. Apparatus according to claim 45, wherein complex-valued communication channels are represented by real-valued components, which are independently processable.

51. Apparatus according to claim 45, wherein the processor is configured to perform an XOR operation.

52. Apparatus for processing data of a plurality of digital communication channels having different data rates using code sequences having different lengths, comprising:

a plurality of first memories for storing at least one copy of one of the code sequences;

a plurality of second memories for storing at least one copy of at least one symbol of one of the communication channels;

a plurality of processors for processing the contents of the first and second memories;

electronic circuitry configured to schedule loading at least one symbol of each of the plurality of communication channels and corresponding code sequences into the second and first memories, respectively, for parallel processing by the plurality of processors; and wherein number of copies of the code sequence stored in the first memories and a number of symbols of the communication channel stored in the second memories are proportional to a data rate of the communication channel.

* * * * *